United States Patent
Shih et al.

(10) Patent No.: US 6,901,538 B2
(45) Date of Patent: May 31, 2005

(54) METHOD, SYSTEM, AND RECORDING MEDIUM OF TESTING A 1394 INTERFACE CARD

(75) Inventors: Chien-Yi Shih, Shindian (TW); Chien-Hsu Chen, Shindian (TW)

(73) Assignee: Via Technologies, Inc., Taipei (TW)

( * ) Notice: Subject to any disclaimer, the term of this patent is extended or adjusted under 35 U.S.C. 154(b) by 473 days.

(21) Appl. No.: 10/121,692

(22) Filed: Apr. 15, 2002

(65) Prior Publication Data

US 2002/0186022 A1 Dec. 12, 2002

(30) Foreign Application Priority Data

May 29, 2001 (TW) .......................... 90112973 A

(51) Int. Cl.⁷ .............................................. G06F 11/00
(52) U.S. Cl. .......................................... 714/43; 714/27
(58) Field of Search ............................ 714/27, 43, 44; 710/301, 302, 129, 305

(56) References Cited

U.S. PATENT DOCUMENTS 5,477,544 A * 12/1995 Botelho ...................... 714/712
2002/0056060 A1 * 5/2002 Saruhashi et al. .......... 714/712

* cited by examiner

*Primary Examiner*—Scott Baderman
(74) *Attorney, Agent, or Firm*—Rabin & Berdo, P.C.

(57) ABSTRACT

A method, system, and recording medium of testing 1394 interface card are disclosed in the present invention. A plurality of ports for the 1394 interface card to be tested are respectively connected to ports of a reference 1394 interface card through cables. One port of the 1394 interface card to be tested and one port of the reference 1394 interface card are in enabled condition and the others are in disabled condition. Only a reference 1394 interface card and two PCI slots are used, the testing process is simplified, and the probability of testing error is decreased.

9 Claims, 4 Drawing Sheets

METHOD, SYSTEM, AND RECORDING MEDIUM OF TESTING A 1394 INTERFACE CARD

This application incorporates by reference of Taiwan application Serial No. 90112973, filed May 29, 2001.

BACKGROUND OF THE INVENTION

1. Field of the Invention

The invention relates to a method of a testing 1394 interface card, and more particularly to a method of testing multi-port 1394 interface card.

2. Description of the Related Art

Due to the rapid development in computer industry, the corresponding peripheral equipments also have been greatly advanced. While the datum are transmitted between the computer and peripheral equipments, such as a printer, a scanner, a display, a keyboard, or another computer, a hardware interface must be installed for data transfer by defining physical interconnection characteristics and signal characteristics. Generally speaking, the serial transfer, such as RS-232, and parallel transfer are commonly used in the traditional method. However, both of them have the disadvantages of low transmitting speed and inconvenient connection.

Accordingly, the interface card of IEEE-1394, comprising the characteristics of hot-plug and high transmitting speed, is produced to satisfy the requirement of high quality in E era. Nowadays, the interface card of 1394 is more and more popular and provides advanced functions, for instance, a 1394 interface card of multi-port. After the manufacturing of a 1394 interface card is completed, a testing step is processed to insure the correctness of its function.

Referring to FIG. 1, it is a diagram for testing a 1394 interface card according to a traditional method. A 1394 interface card 102 to be tested comprises multiple ports, for instance, three ports of a zeroth port, a first port, and a second port. Three reference 1394 interface cards 104, 106, and 108, wherein each reference 1394 interface card is a 1394 interface card having already passed testing and verification, are provided, and each of them comprises a zeroth port, a first port, and a second port, respectively.

The three ports of 1394 interface card 102 to be tested are tested simultaneously and are respectively connected to the reference 1394 interface card 104, 106, 108 at the same time, wherein the zeroth port of the 1394 interface card 102 to be tested is connected to the zeroth port of the reference 1394 interface card 104 through cable 110, the first port of the 1394 interface card 102 to be tested is connected to the first port of the reference 1394 interface card 106 through cable 112, and the second port of the 1394 interface card to be tested 102 is connected to the second port of the reference 1394 interface card 108 through cable 114. However, using three reference 1394 interface cards at the same time increases the cost of testing.

For example, as the number of ports for the 1394 interface card to be tested 102 increases to six, the number of reference 1394 interface cards also increases to six. Accordingly, the number the peripheral component interconnect (PCI) slot is increased, too. However, the number of PCI slots on a main board develops in the trend of decreasing for the reason that the chips are highly integrated. Therefore, the number of main boards used in the process of testing should be increased, which causes the increasing of the testing complexity and the probability of testing error.

Referring to FIG. 2, it is a diagram for testing a 1394 card by simply using a reference 1394 interface card, wherein two ports of 1394 interface card 102 to be tested are connected to the two ports of the reference 1394 interface card 204. In this example, the connections between the 1394 interface card 102 to be tested and the reference 1394 interface card do not obey the rule of tree structure and a closed loop is formed to cause the abnormal operations for the 1394 interface card 102 to be tested and the reference 1394 interface card.

In still another traditional method, the three ports of 1394 interface card 102 to be tested are tested sequentially by using one reference 1394 interface card at a time to avoid the closed loop problem, wherein one port of the 1394 interface card 102 to be tested is connected to one port of the reference 1394 interface card. However, the actions of connection and disconnection between ports and cables increase the probability of testing error.

SUMMARY OF THE INVENTION

It is therefore an object of the invention to provide a method of testing 1394 interface card by simply using a reference 1394 interface card and two PCI slots. And the testing process is simplified and the probability of testing error is decreased.

The invention achieves the above-identified objects by providing a new method, which is applicable for a 1394 interface card to be tested comprising more than three ports. A 1394 interface card to be tested comprising M ports is tested by using a reference 1394 interface card of N ports, wherein $N \geq M$ and both of N and M are positive integer. All ports of 1394 interface card to be tested are connected to M ports of the reference 1394 interface card respectively by M cables. First, the jth port of the 1394 interface card to be tested is enabled and the other (M-1) ports of 1394 interface card to be tested are disabled, wherein j is 0. Second, the jth port of the 1394 interface card to be tested is tested to check the correctness of its function. Third, one is added to j. Finally, the first, second, and third step are processed cyclically until j is (M-1). Either two of the 1394 interface card to be tested and the reference 1394 interface card are respectively plugged in a first PCI slot and a second PCI slot on the same main board or two off them are respectively plugged in a PCI slot on a first main board and a PCI slot on a second main board.

Other objects, features, and advantages of the invention will become apparent from the following detailed description of the preferred but non-limiting embodiment. The following description is made with reference to the accompanying drawings.

DETAILED DESCRIPTION OF THE INVENTION

The present invention completes the testing of a 1394 interface card by simply using a reference 1394 interface card and two PCI slots.

Figure 1:
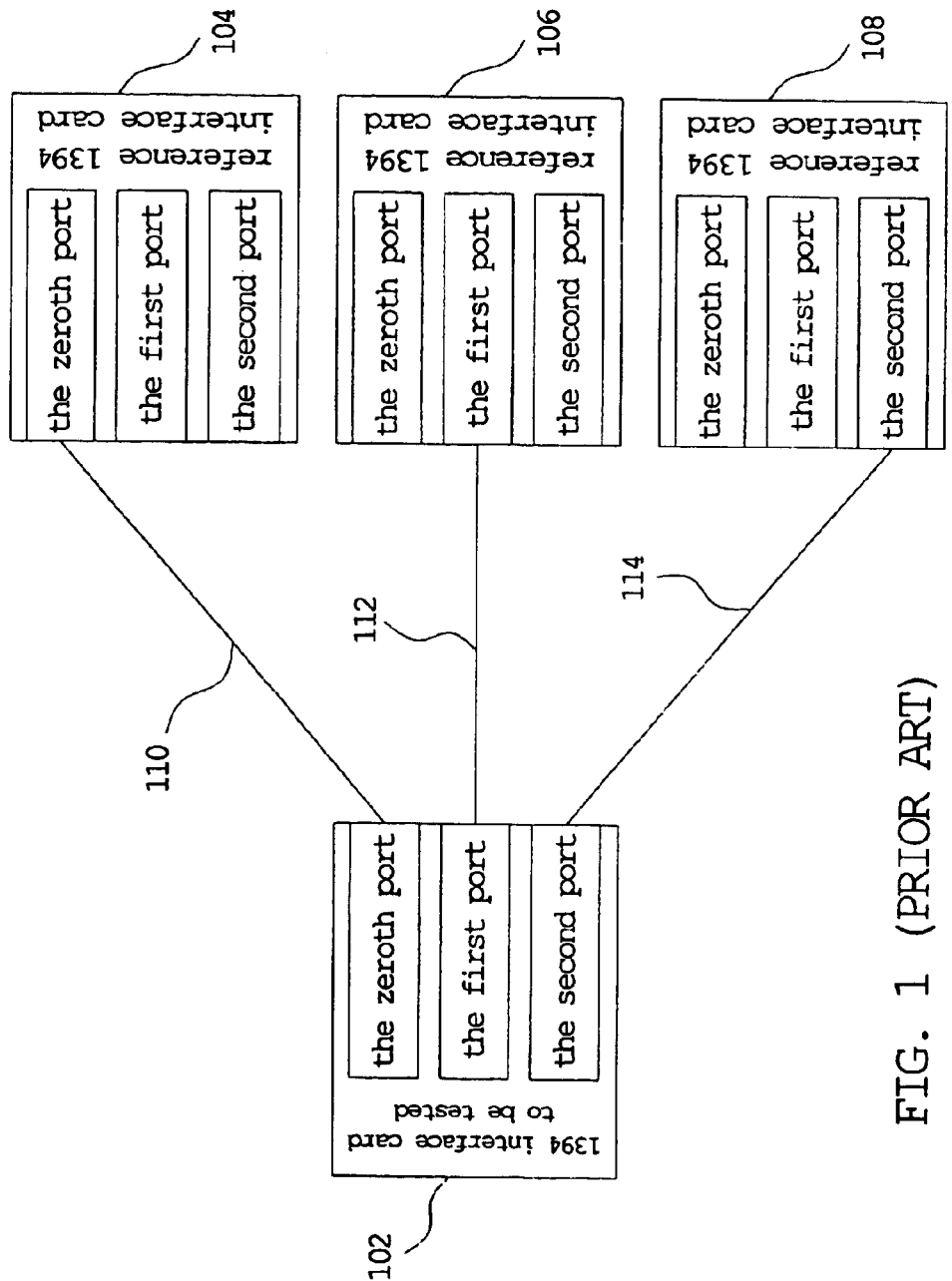
FIG. 1 is a diagram for testing a 1394 interface card according to a traditional method.
Figure 2:
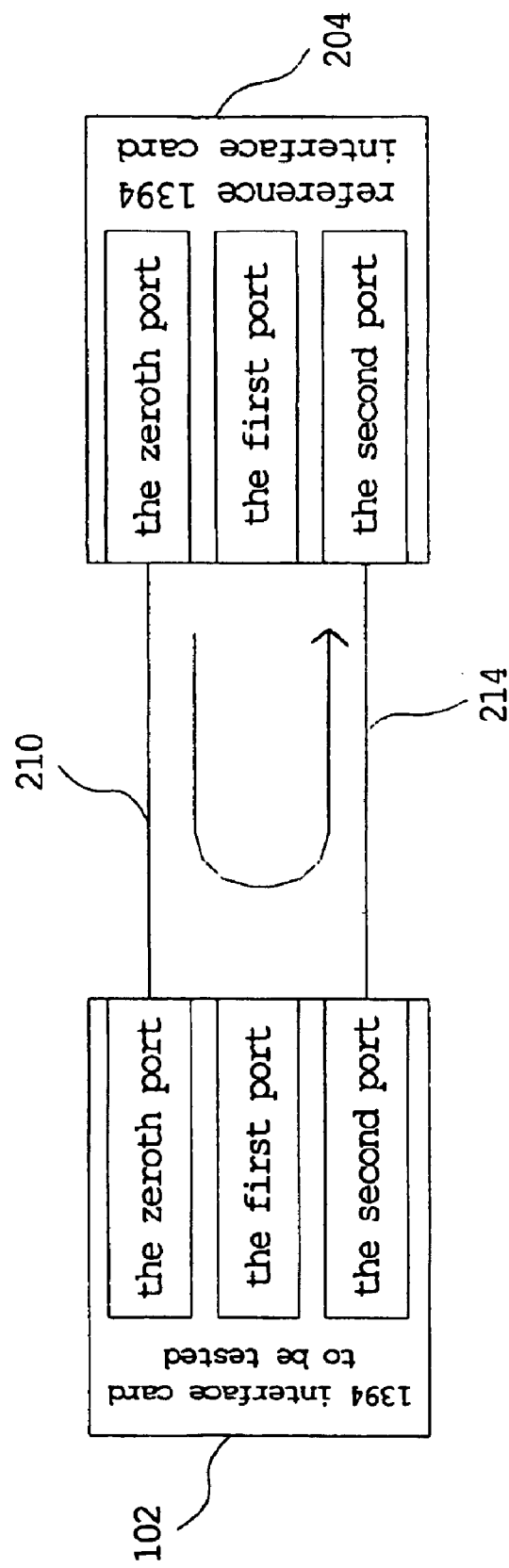
FIG. 2 is a diagram of testing structure by simply using a reference 1394 interface card according to a traditional method, wherein two ports of 1394 interface card to be tested are connected to the two ports of the reference 1394 interface card.
Figure 3:
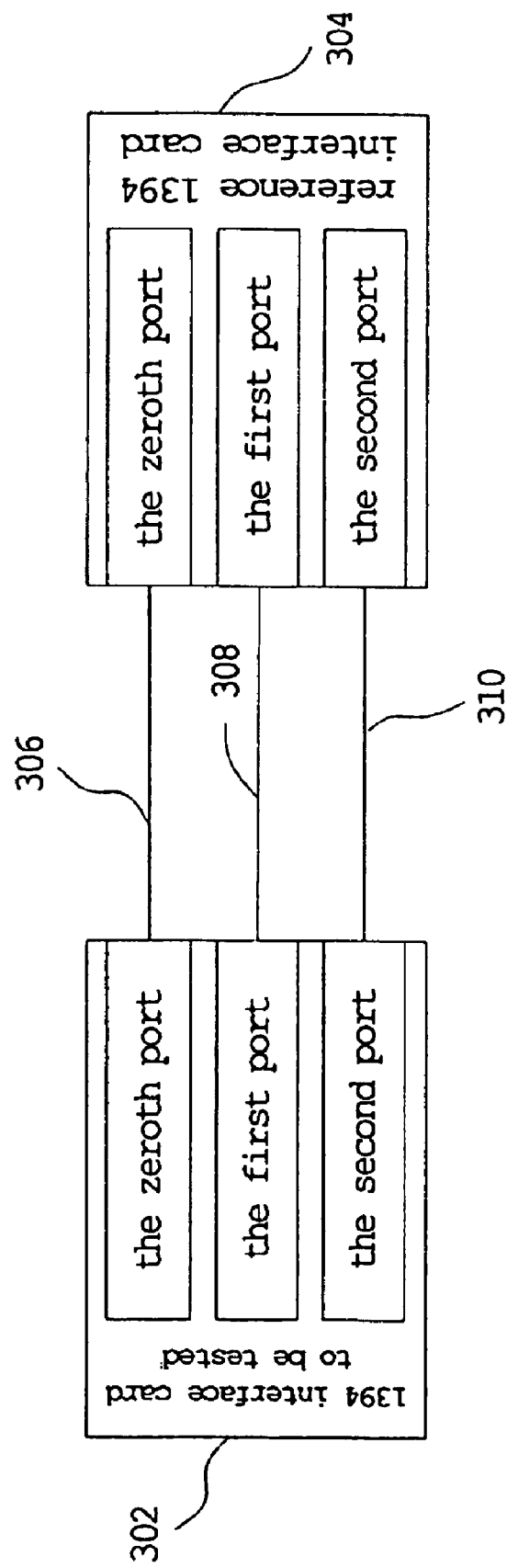
FIG. 3 is a block diagram of testing structure according to a preferred embodiment of the present invention.

Referring to FIG. 3, it is a block diagram of testing structure according to a preferred embodiment of the present invention. A 1394 interface card to be tested 302 is plugged in a PCI slot and comprises three ports of a zeroth port, a first port, and a second port. A reference 1394 interface card 304 is plugged in another PCI slot with the quantity of the ports more than or equal to that of 1394 interface card 302, for instance, three ports of a zeroth port, a first port, and a second port. The zeroth port of the 1394 interface card to be tested 302 is connected to the zeroth port of the reference 1394 interface card 304 through cable 306, the first port of the 1394 interface card to be tested 302 is connected to the first port of the reference 1394 interface card 304 through cable 308, and the second port of the 1394 interface card to be tested 302 is connected to the second port of the reference 1394 interface card 304 through cable 310.

Figure 4:
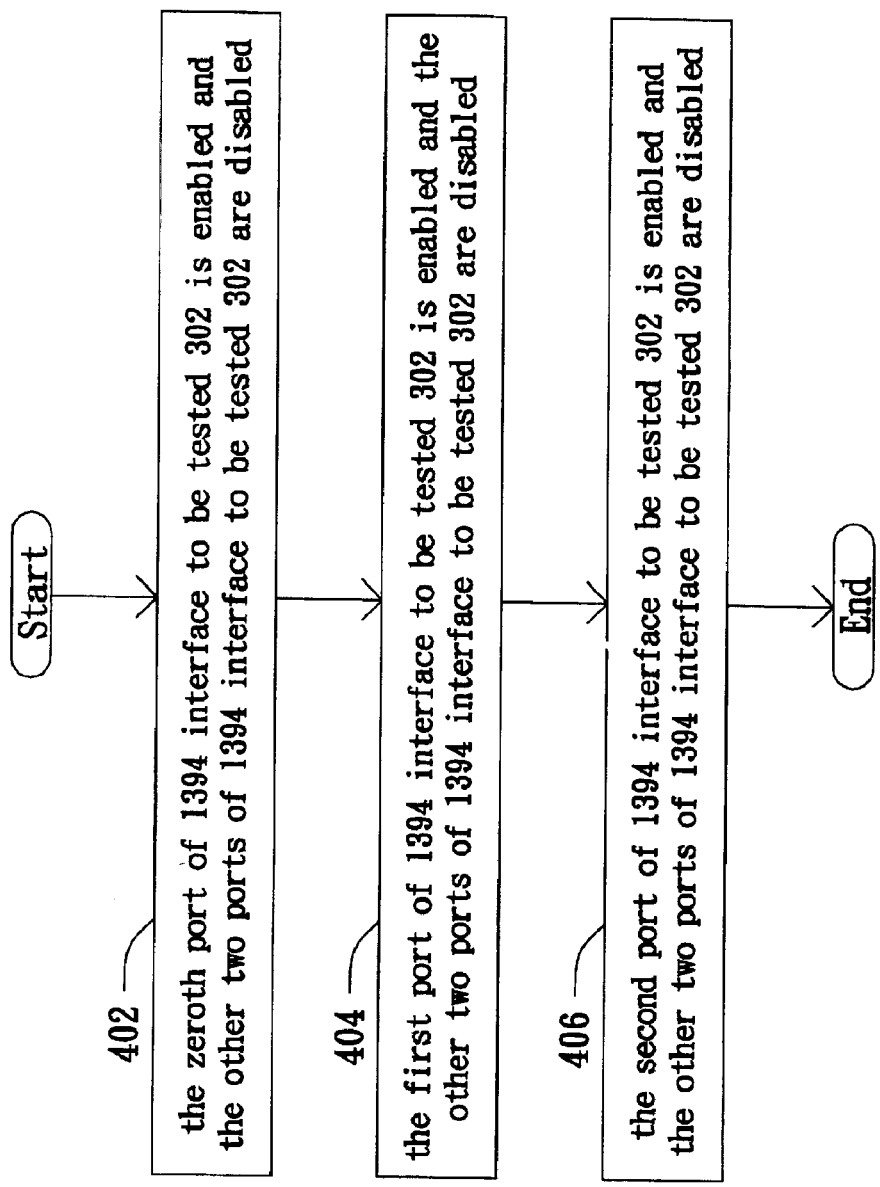
FIG. 4 is the flow chart of the testing method in the present invention.

Referring to FIG. 4, it is the flow chart of the testing method in the present invention. In starting step, the testing structure of FIG. 3 is prepared. In step 402, the zeroth port of the 1394 interface card to be tested 302 is enabled and the other two ports of the 1394 interface card to be tested 302 are disabled. Then, a test packet is transmitted between the zeroth port of the 1394 interface card to be tested 302 and the zeroth port of the reference 1394 interface card 304 through cable 306 to test the functionality of the zeroth port for the 1394 interface card to be tested 302.

In step 404, the first port of the 1394 interface card to be tested 302 is enabled and the other two ports of the 1394 interface card to be tested 302 are disabled. Then, a test packet is transmitted between the first port of the 1394 interface card to be tested 302 and the first port of the reference 1394 interface card 304 through cable 308. The functionality of the first port for the 1394 interface card to be tested 302 can be tested in this step.

In step 406, the second port of the 1394 interface card to be tested 302 is enabled and the other two ports of the 1394 interface card to be tested 302 are disabled. Then, a test packet is transmitted between the second port of the 1394 interface card to be tested 402 and the second port of the reference 1394 interface card through cable 310. The functionality of the second port for the 1394 interface card to be tested 302 can be tested in this step.

The above control operation of 1394 interface card to be tested 302 can be achieved by software.

In the present invention, only one port of the 1394 interface card to be tested 302 and one port of reference 1394 interface card 304 are enabled at one time. The circuit problem of the traditional method will not be produced because of being out of tree-form structure.

Moreover, in the whole testing process, the cables 306, 308, 310 are not plugged in or unplugged as often as prior art, the system becomes more stable, and the probability of testing error is decreased.

Finally, the number of main board will not be increased as the number of port for the 1394 interface card to be tested is increased. In the present invention, only another suitable reference 1394 interface card should substitute for the original one while a 1394 card with different number of connection ports is to be tested, and the testing complexity is decreased.

Especially, the present invention is applicable for the 1394 interface card to be tested comprising more than three ports. For example, a 1394 interface card to be tested comprising M ports is tested by using a reference 1394 interface card of N ports, wherein N≧M and both of N and M are positive integer. All ports of 1394 interface card to be tested are connected to M ports of the reference 1394 interface card by M cables, respectively. First, the jth port of the 1394 interface card to be tested is enabled and the other (M-1) ports of 1394 interface card to be tested are disabled, wherein j is 0. Second, the jth port of the 1394 interface card to be tested is tested to check the correctness of its function. Third, one is added to j. Finally, the first, second, and third step are repeated until j is (M-1). The 1394 interface card to be tested and the reference 1394 interface card are respectively plugged in a first PCI slot and a second PCI slot on the same main board. Alternatively, they are respectively plugged in a PCI slot on a first main board and a PCI slot on a second main board.

By simply using a reference 1394 interface card and two PCI slots, all ports of the 1394 interface card are tested and the testing software, method, and system can be completed. In the present invention, the testing procedure is simplified and the probability of testing error is decreased.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of testing a 1394 Interface card to be tested comprising M ports by using a reference 1394 interface card with N ports, wherein N≧M and both of N and M are positive integers, all ports of said 1394 interface card to be tested are connected to M ports of said reference 1394 interface card respectively by M cables, said method comprising the steps of:

a. setting an integer parameter j=0;
   b. enabling jth port of said 1394 interface card to be tested and disabling the other (M-1) ports of said 1394 interface card to be tested;
   c. testing said jth port of the 1394 interface card to be tested, a test packet being transmitted between the jth port of the 1394 interface card to be tested and the jth port of the reference 1394 interface card through the corresponding cable to test the functionality of the jth port for the 1394 interface card to be tested; and
   d. increasing j by one and repeating steps of b, c, and d, if j is less than M;
   wherein the reference 1394 interface card is a 1394 interface card having already passed testing and verification.

2. The method according to claim 1, wherein said 1394 interface card to be tested and said reference 1394 interface card are respectively plugged in a first PCI (peripheral component interconnect) slot and a second PCI slot on a same main board.

3. The method according to claim 1, wherein said 1394 interface card to be tested and said reference 1394 interface card are respectively plugged in a PCI slot on a first main board and a PCI slot on a second main board.

4. A system of testing a 1394 interface card to be tested comprising:

a reference 1394 interface card of N ports, wherein N is a positive integer;
   a 1394 interface card to be tested comprising M ports, wherein N≧M and M is a positive integer, all ports of said 1394 interface card to be tested are connected to M ports of said reference 1394 interface card respectively by M cables; and a testing means to test M ports for said 1394 interface card to be tested and to process the steps of:
  a. setting an integer parameter j=0;
  b. enabling jth port of said 1394 interface card to be tested and disabling the other (M-1) ports of said 1394 interface card to be tested;
  c. testing said jth port of the 1394 interface card to be tested a test packet being transmitted between the jth port of the 1394 interface card to be tested and the jth port of the reference 1394 interface card through the corresponding cable to test the functionality of the jth port for the 1394 interface card to be tested; and
  d. increasing j by one and repeating steps of b, c, and d, if j is less than M;
  wherein the reference 1394 interface card is a 1394 interface card having already passed testing and verification.

5. The system according to claim 4, wherein said 1394 interface card to be tested and said reference 1394 interface card are respectively plugged in a first PCI slot and a second PCI slot on a same main board.

6. The system according to claim 4, wherein said 1394 interface card to be tested and said reference 1394 interface card are respectively plugged in a PCI slot on a first main board and a PCI slot on a second main board.

7. A recording medium readable by a computer to test a 1394 interface card to be tested, wherein a program of testing the 1394 interface card is recorded thereon, said 1394 interface card to be tested comprising M ports, said testing program driving a reference 1394 interface card of N ports, wherein N≧M and both of N and M are positive integers, all ports of said 1394 interface card to be tested are connected to M ports of said reference 1394 interface card respectively by M cables, said program executing the following steps:
  a. setting an integer parameter j=0;
  b. enabling jth port of said 1394 interface card to be tested and disabling the other (M-1) ports of said 1394 interface card to be tested;
  c. testing said jth port of the 1394 interface card to be tested, a test packet being transmitted between the jth port of the 1394 interface card to be tested and the jth port of the reference 1394 interface card through the corresponding cable to test the functionality of the jth port for the 1394 interface card to be tested; and
  d. increasing j by one and repeating steps of b, c, and d, if j is less than M;
  wherein the reference 1394 interface card is a 1394 interface card having already passed testing and verification.

8. The recording medium according to claim 7, wherein said 1394 interface card to be tested and said reference 1394 interface card are respectively plugged in a first PCI slot and a second PCI slot on a same main board.

9. The recording medium according to claim 7, wherein said 1394 interface card to be tested and said reference 1394 interface card are respectively plugged in a PCI slot on a first main board and a PCI slot on a second main board.

* * * * *